United States Patent
Han et al.

(10) Patent No.: US 11,760,672 B2
(45) Date of Patent: Sep. 19, 2023

(54) ANTISCALE DISPERSANT COMPOSITION AND USE THEREOF

(71) Applicant: Ecolab USA Inc., St. Paul, MN (US)

(72) Inventors: Ling Feng Han, Shanghai (CN); Yin Yin Tong, Shanghai (CN); Fan Yang, Shanghai (CN); Chun Bo Yu, Shanghai (CN)

(73) Assignee: ECOLAB USA Inc., St. Paul, MN (US)

( * ) Notice: Subject to any disclaimer, the term of this patent is extended or adjusted under 35 U.S.C. 154(b) by 144 days.

(21) Appl. No.: 15/757,488

(22) PCT Filed: Sep. 23, 2016

(86) PCT No.: PCT/US2016/053310
§ 371 (c)(1),
(2) Date: Mar. 5, 2018

(87) PCT Pub. No.: WO2017/053702
PCT Pub. Date: Mar. 30, 2017

(65) Prior Publication Data
US 2018/0244553 A1    Aug. 30, 2018

(30) Foreign Application Priority Data
Sep. 25, 2015 (CN) .......................... 201510623688.3

(51) Int. Cl.
*C02F 5/12* (2023.01)
*C02F 5/14* (2023.01)
(Continued)

(52) U.S. Cl.
CPC .................. *C02F 5/12* (2013.01); *C02F 5/10* (2013.01); *C02F 5/14* (2013.01); *C08L 25/18* (2013.01);
(Continued)

(58) Field of Classification Search
CPC .......... C08L 25/18; C08L 33/02; C08L 33/24; C02F 2103/34; C02F 5/10; C02F 5/12; C02F 5/14; C23F 14/02
See application file for complete search history.

(56) References Cited

U.S. PATENT DOCUMENTS

| | | | | |
|---|---|---|---|---|
| 4,640,793 A | * | 2/1987 | Persinski .................. | C02F 5/10 210/696 |
| 5,078,891 A | * | 1/1992 | Sherwood ................ | C02F 5/14 210/699 |

(Continued)

FOREIGN PATENT DOCUMENTS

| | | |
|---|---|---|
| CN | 1781857 A | 6/2006 |
| CN | 102329011 A | 1/2012 |

(Continued)

OTHER PUBLICATIONS

English language machine translation of CN 102329011, 6 Pages, No Date.*

(Continued)

*Primary Examiner* — Pranav N Patel
(74) *Attorney, Agent, or Firm* — Eric D. Babych; Barnes & Thornburg LLP

(57) ABSTRACT

The present disclosure relates to antiscale dispersant compositions. The compositions may include various components. The compositions may be used in connection with gray and/or black water processing in a coal gasification system. The compositions are useful for inhibiting the deposition of various materials, such as calcium carbonate, calcium phosphate, iron, aluminum, silicate, calcium sulfate, and any suspended solids in the water.

15 Claims, 1 Drawing Sheet

(51) Int. Cl.
*C08L 25/18* (2006.01)
*C08L 33/02* (2006.01)
*C23F 14/02* (2006.01)
*C02F 5/10* (2023.01)
*C08L 33/24* (2006.01)
*C02F 103/34* (2006.01)

(52) U.S. Cl.
CPC ............... *C08L 33/02* (2013.01); *C08L 33/24* (2013.01); *C23F 14/02* (2013.01); *C02F 2103/34* (2013.01)

(56) References Cited

U.S. PATENT DOCUMENTS

| | | | | |
|---|---|---|---|---|
| 2004/0135125 A1* | 7/2004 | Morris | ...................... | C02F 5/12 252/408.1 |
| 2012/0118575 A1* | 5/2012 | Griffin | ...................... | C02F 5/10 166/310 |
| 2014/0097144 A1* | 4/2014 | Li | ........................ | C11D 7/3281 210/747.5 |

FOREIGN PATENT DOCUMENTS

| | | | |
|---|---|---|---|
| CN | 102674570 A | | 9/2012 |
| JP | 2003-080294 A | * | 3/2003 |
| WO | WO 01/81654 A1 | | 11/2001 |
| WO | WO 2012/065129 A1 | | 5/2012 |

OTHER PUBLICATIONS

Amjad, Zahid, and Robert W. Zuhl. "Heat Treatment of Synthetic Polymers as CaCO." Materials Performance (2008). (Year: 2008).*
International Search Report and Written Opinion for International Application No. PCT/US2016/053310, 10 pages (dated Jan. 19, 2017).
Japanese Office Action, Application No. 2015106236883, Dated Sep. 27, 2020 and English Summary of Office Action.

* cited by examiner

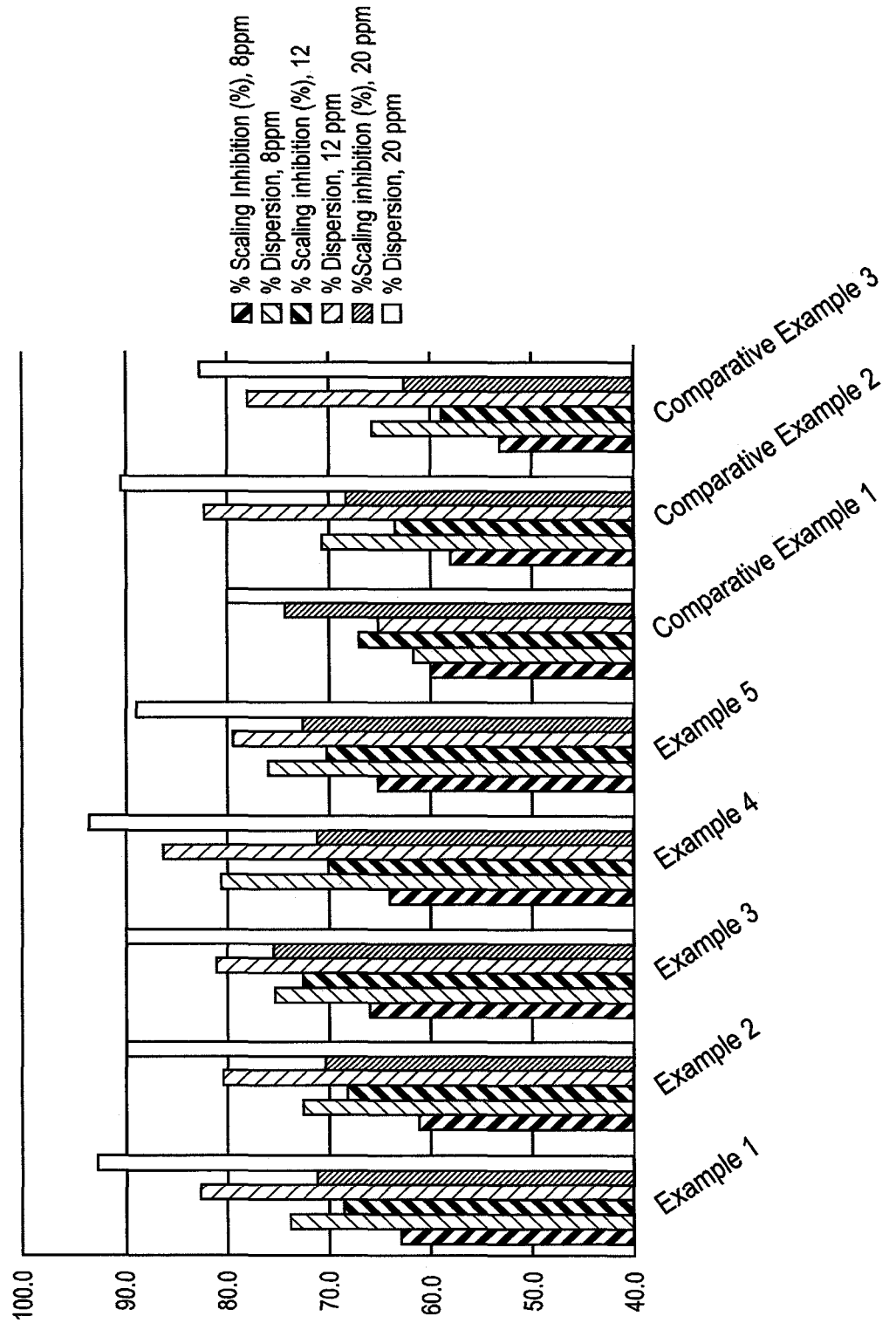

ANTISCALE DISPERSANT COMPOSITION AND USE THEREOF

CROSS-REFERENCE TO RELATED APPLICATION

This application claims priority to Chinese Patent Application Serial No. 20150623688.3 filed on Sep. 25, 2015, the disclosure of which is incorporated herein by reference in its entirety.

TECHNICAL FIELD

The present application relates to antiscale dispersant compositions that may be used in various industrial processes, such as coal gasification.

BACKGROUND

Coal water slurry gasification includes the step of slag-water processing and objectives of this step may include cooling the black water, recovering the heat, removing dissolved gas, separating the slag from the water, and recycling the water. Trouble-free operation of the slag-water system is highly desirable to achieve long-lasting and stable operation of the entire system. However, the water quality generally has a tendency to cause scaling and deposition during the operation process, which can cause blockages in various devices and conduits. It also may induce a reduction in the amount of chilling water and in the efficiency of heat exchanging. In order to ensure long-lasting and stable operation of the coal gasification slag-water system, it is important to control scaling and deposition, such as by adding an antiscale dispersant.

BRIEF SUMMARY

Below is a summarization of the various aspects and embodiments of the present application. The summarization is meant for illustrative purposes and is not intended to limit the scope of claims.

In one aspect of the present disclosure, a composition is provided, the composition comprising a first component and a second component. The first component comprises a polymer, wherein the polymer comprises a monomer selected from the group consisting of acrylic acid, methacrylic acid, maleic acid, fumaric acid, itaconic acid, salts of any of the foregoing monomers, and any combination thereof. The second component also comprises a polymer, the polymer of the second component comprising a sulfonate monomer and at least one of acrylic acid or a salt of acrylic acid.

The present disclosure also provides for the use of this composition (or any other antiscale dispersant composition disclosed herein) for gray and/or black water processing in a coal gasification system. Additionally, the disclosure provides for the use of this composition (or any other antiscale dispersant composition disclosed herein) for inhibiting the deposition in a water system of a material selected from the group consisting of calcium carbonate, calcium phosphate, iron, aluminum, silicate, calcium sulfate, suspended solids, and any combination thereof.

BRIEF DESCRIPTION OF THE DRAWING FIGURES

The drawings are used to supplement the understanding of the embodiments of the present invention and constitute a part of the description. The drawings are meant to be illustrative and non-limiting.

FIG. 1 is a graph depicting scale inhibition and dispersion performance of certain antiscale dispersant compositions according to the present disclosure and certain comparative examples.

DETAILED DESCRIPTION

In some embodiments, the present disclosure provides antiscale dispersant compositions to address the high hardness, high alkalinity, high temperature, and high suspended solids properties of gray water. The antiscale dispersant compositions have superior stability and dispersity and can efficiently inhibit scaling and deposition in a water system.

In certain embodiments, the present disclosure provides antiscale dispersant compositions that can be used in coal gasification systems, such as during gray and/or black water processing.

In some embodiments, the present disclosure also provides antiscale dispersant compositions that can be used for inhibiting the deposition of one or more materials selected from the group consisting of calcium carbonate, calcium phosphate, iron, aluminum, silicate, calcium sulfate, any suspended solids in the water system, and any combination thereof.

In at least one embodiment, an antiscale dispersant composition comprises a first component selected from the group consisting of a homopolymer of acrylic acid, methacrylic acid, maleic acid, fumaric acid, and itaconic acid. Water soluble salts of any of these monomers can also be used. Additionally, the component may comprise copolymers, terpolymers, etc., of two or more of any of the above-mentioned monomers.

The antiscale dispersant composition also comprises a second component selected from the group consisting of a copolymer of acrylic acid (or a water soluble salt thereof) with a sulphonate monomer and optionally an acrylamide monomer. The second component may also comprise a fluorescent monomer.

In some embodiments, the sulphonate monomer may be an alkene sulphonate monomer. For example, the sulphonate monomer may be selected from the group consisting of 2-acrylamide-2-methylpropanesulfonic acid salt, allylsulfonate, methyl allylsulfonate, meta-styrenesulfonic acid salt, ortho-styrenesulfonic acid salt, and/or para-styrenesulfonic acid salt. In certain embodiments, the salt may be selected from sodium or potassium. For example, the sulphonate monomer may comprise the sodium salt or the potassium salt of 2-acrylamide-2-methylpropanesulfonic acid. Additionally, the sulphonate monomer may comprise the sodium salt or potassium salt of para-styrenesulfonic acid (sodium para-styrenesulfonate/potassium para-styrenesulfonate).

In some embodiments, when the first component is a polymer comprising two or more of the monomers, an amount of the acrylic acid or water soluble salt thereof may be in a range of about 30 wt. % to about 80 wt. % of the first component. An amount of other monomers and/or water soluble salts thereof may be in a range from about 0 wt. % to about 80 wt. % of the first component, provided that an amount of at least one of the other monomers or water soluble salts thereof is greater than 0 wt. %.

In particular embodiments, the first component is selected from a polymer comprising acrylic acid, a water soluble acrylate polymer (such as a sodium acrylate polymer), a copolymer of acrylic acid and maleic acid, or any combination thereof.

With respect to the second component, an amount of the acrylic acid or water soluble salt thereof may be in a range of about 30 wt. % to about 80 wt. %. An amount of the sulphonate monomer may be in a range of about 10 wt. % to about 60 wt. %. Further, an amount of the acrylamide monomer may be in a range of about 0 wt. % to about 20 wt. % and an amount of the fluorescent monomer may be in a range of about 0 wt. % to about 5 wt. %.

In some embodiments, the second component comprises a copolymer of acrylic acid and sodium para-styrenesulfonate. In certain embodiments, the second component comprises an acrylic acid polymer with sodium para-styrenesulfonate. In other embodiments, the second component comprises a polymer comprising acrylic acid, 2-acrylamide-2-methylpropanesulfonate sodium, and 2-hydroxy-3-allyloxy-propyl quaternary salt (4-MNDMAPN-HAPQ).

In some embodiments, the fluorescent monomer of the second component may comprise 4-methoxy-N-(3-N', N'-dimethylamine propyl) naphthalene imide, 4-MNDMAPN-HAPQ, which has the following structural formula:

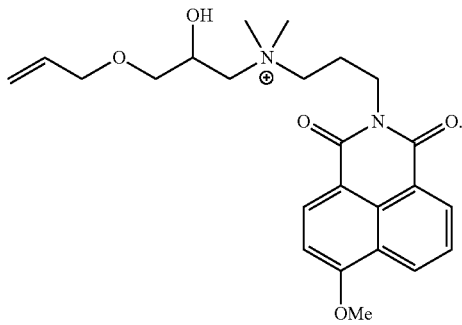 [SMILES: C=CCOCC(O)C[N+](C)(C)CCCN1C(=O)c2cccc3c(OC)ccc(c23)C1=O]

As such, the second component may comprise, for example, a copolymer of acrylic acid, 2-acrylamide-2-methylpropanesulfonic acid (or a salt thereof), and 4-MNDMAPN-HAPQ.

In some embodiments, the copolymer of the second component may be synthesized using free radical polymerization in an aqueous solution. The copolymer may be formed using a water-in-oil polymerization method, a dispersion polymerization method, or a solution polymerization method.

While the amount of the first and second component in the antiscale dispersant compositions is not particularly limited, illustrative exemplary ranges include from about 5 wt. % to about 30 wt. % of the first component and from about 5 wt. % to about 36 wt. % of the second component. In some embodiments, the amount of the first component is from about 10 wt. % to about 20 wt. % and the amount of the second component is from about 15 wt. % to about 30 wt. %.

In still further embodiments, the antiscale dispersant compositions may comprise a third component. The third component may be an organophosphine compound. Illustrative, non-limiting examples of organophosphine compounds include 2-phosphonobutane-1,2,4-tricarboxylic acid and salts thereof, amino trimethylene phosphonic acid and salts thereof, 1-hydroxyethylidene-1,1-diphosphonic acid and salts thereof, polyamino polyether methylene phosphonic acid and salts thereof, polyhydric alcohol phosphate ester, and any combination thereof.

The amount of the third component in the antiscale dispersant composition is not particularly limited and in some embodiments, it may be present in an amount from about 0 wt. % to about 35 wt. % of the antiscale dispersant composition.

Although the third component is not required for a proper functioning of the present invention, the inventors unexpectedly discovered that there is a synergistic effect between the third component and the first and second components. That is, the ability of the antiscale dispersant composition to control scale and deposition can be unexpectedly enhanced by addition of the third component.

In additional embodiments, the antiscale dispersant composition may further comprise a pH conditioner. The pH conditioner may be selected from the group consisting of sodium hydroxide, hydrochloride acid, a sulfate, a carbonate, a phosphate, and the like. The pH conditioner can adjust the pH of the antiscale dispersant composition in the range of about 1 to about 12, depending on the application conditions. The amount of pH conditioner is not particularly limited and in some embodiments, the antiscale dispersant composition may comprise from about 0 wt. % to about 10 wt. % of the pH conditioner.

Methods of manufacturing the presently disclosed antiscale dispersant compositions are not particularly limited. In some embodiments, the various components may be added to a reactor under mixing. Any order of addition may be utilized. In some embodiments, some or all of the components may be added simultaneously and in certain embodiments, some or all of the components may be premixed before addition to the reactor.

In one exemplary method of manufacture, the first component may be added to a reactor at room temperature. The rate of addition can be controlled by one of ordinary skill in the art. In some embodiments, a slow rate of addition is desirable to avoid bubble forming. The second component may also be added to the reactor at room temperature. The first and second components may be stirred until they have been adequately mixed for the desired use. Optionally, the third component and/or the pH conditioner may be added to the reactor at room temperature under stirring until it has been adequately mixed with the first and second components. Again, the degree of mixing required will depend on the desired use of the composition. In some embodiments, the temperature inside of the reactor is about 40° C. or below but the specific temperature may be adjusted depending on the target pH of the final product.

One of ordinary skill in the art will understand that the antiscale dispersant compositions may be formulated by mixing all of the components together or each component may be supplied in a separate container and only mixed when used. For example, some or all of the components of the antiscale dispersant composition may be added simultaneously into a water system to be treated or they may be added in any order to the system.

In additional embodiments, the present application provides for the use of the antiscale dispersant compositions for gray and/or black water processing in coal gasification systems. The antiscale dispersant compositions are useful under high temperature conditions (such as up to about 280° Centigrade), high pressure conditions (such as up to about 6.5 MPa), and high suspended solids content (such as greater than about 10,000 ppm). Under any or all of these conditions, the presently disclosed antiscale dispersant compositions can efficiently inhibit the deposition of calcium carbonate, calcium phosphate, iron, aluminum, silicate, calcium sulfate, any suspended solids in the water system, and any combination thereof. One of ordinary skill in the art will understand that inhibiting deposition of any of these materials can be carried out with the presently disclosed antiscale dispersant compositions in any aqueous system, such as a boiler, and their application is not limited to coal gasification systems. Moreover, the antiscale dispersant compositions may be used in connection with an on-line dosing control system, such as the 3D TRASAR® system offered by Nalco, an Ecolab company.

Currently, in a gray water system, dosing of dispersant is generally carried out by adding a fixed dosage of dispersant at a fixed point and operators cannot adjust the amount of the dispersant according to the fluctuations of the system. An on-line dosing control system can automatically detect system fluctuations and dose an appropriate amount of dispersant in response thereto, thereby reducing dispersant consumption and ensuring optimal performance In one exemplary embodiment of an on-line system, the polymer of the second component may comprise a fluorescent molecule (e.g., 4-MNDMAPN-HAPQ) and a system monitor and/or controller may measure the fluorescent signal. The measured fluorescent signal can be converted to electrical signals corresponding to the concentration of the second component. Therefore, when a water sample containing the second component continuously passes through a launder, for example, the fluorescent signal of the polymer of the second component can be measured and a gain or loss of the second component can be determined. Therefore, users can adjust the dispersant dosage according to the specific requirements of the aqueous system and the measured change in concentration of the second component.

The presently disclosed antiscale dispersant compositions exhibit good performance in scale inhibition, deposition control in black and/or gray water processing, and can help extend the life of the system by mitigating scaling and deposition, reducing the complexity and work load of system maintenance, extending asset life of the system, increasing gray water recycle efficiency, and reducing discharge volume of waste water. Moreover, the antiscale dispersant compositions can be incorporated into an on-line dosing control system for more sensitive responses to changes in operating conditions, such as changes in water flow, water quality, coal slurry quality, and/or production load.

EXAMPLES

It should be understood that the following examples are meant to illustrate various aspects and beneficial effects of the presently disclosed invention and are not meant to place any limitations.

I. Preparation of Antiscale Dispersant Compositions

Example 1

An aqueous solution containing about 27.6 g of the first component and about 12 g of the second component was prepared by the following method:

1. About 60 g of a sodium acrylate polymer (available from Nalco Company (Product No. PR4512) with a concentration of about 46 wt. %) were charged into a reactor.
2. About 40 g of a copolymer comprising acrylic acid and sodium para-styrenesulfonate (available from Nalco Company (Product No. PR4848) with a concentration of about 30 wt. %) were added into the reactor slowly and was stirred to completely mix the components.

Example 2

An aqueous solution comprising about 9.2 g of the first component, about 35.25 g of the second component, and about 2.4 g of a pH conditioner was prepared by the following method:

1. About 20 g of sodium acrylate polymer (available from Nalco Company (Product No. PR4512) with a concentration of about 46 wt. %) were charged into a reactor.
2. About 75 g of a copolymer comprising acrylic acid, 2-acrylamide-2-methylpropanesulfonate sodium, and 4-MNDMAPN-HAPQ (available from Nalco Company (Product No. D04C0) with a concentration of about 47 wt. %) were added into the reactor slowly and was stirred to completely mix the components.
3. A cooling jacket around the reactor was activated and about 5 g of a NaOH solution (available from Nalco Company (Product No. R-7480) with a concentration of about 48 wt. %) were added (with mixing) into the reactor slowly to adjust the pH to about 10.

Example 3

An aqueous solution comprising about 8 g of the first component, about 12 g of the second component, and about 20 g of the third component was prepared by the following method:

1. About 20 g of a copolymer comprising acrylic acid and maleic acid were charged into a reactor.
2. About 40 g of a copolymer comprising acrylic acid and sodium para-styrenesulfonate were added into the reactor and the contents were mixed.
3. About 40 g of a 2-phosphonobutane-1,2,4-tricarboxylic acid solution were added into the reactor under mixing.

Example 4

An aqueous solution comprising about 20 g of the first component, about 18.8 g of the second component, and about 10.4 g of the third component was prepared by the following method:

1. About 40 g of an acrylic acid polymer were charged into a reactor.
2. About 40 g of a copolymer comprising acrylic acid, 2-acrylamide-2-methylpropanesulfonate sodium, and 4-MNDMAPN-HAPQ were added into the reactor slowly and the components were mixed.
3. About 20 g of an amino trimethylene phosphonic acid solution were added into the reactor slowly under mixing.

Example 5

An aqueous solution comprising about 8 g of the first component, about 9.2 g of the second component, about 31 g of the third component, and about 2.4 g of a pH conditioner was prepared by the following method:

1. About 20 g of a copolymer comprising acrylic acid and maleic acid were charged into a reactor.
2. About 15 g of a copolymer comprising acrylic acid and sodium para-styrenesulfonate were added into the reactor slowly and the components were mixed.
3. About 10 g of a copolymer comprising acrylic acid, 2-acrylamide-2-methylpropanesulfonate sodium, and 4-MNDMAPN-HAPQ were added into the reactor under stirring.

4. About 50 g of a 1-hydroxyethylidene-1,1-diphosphonic acid solution were added into the reactor slowly under stirring.

5. A cooling jacket around the reactor was activated and about 5 g of a NaOH solution were added into the reactor slowly (under mixing) to adjust the pH to about 11.

Comparative Example 1

A composition containing only the first component was prepared by the following method:
1. About 50 g of an acrylic acid polymer were charged into a reactor.
2. About 50 g of a copolymer comprising acrylic acid and maleic acid were added into the reactor slowly under mixing.

Comparative Example 2

A composition containing only the second component was prepared by the following method:
1. About 40 g of a copolymer containing acrylic acid and sodium para-styrenesulfonate were charged into a reactor.
2. About 60 g of a copolymer containing acrylic acid, 2-acrylamide-2-methylpropanesulfonate sodium, and 4-MNDMAPN-HAPQ were added into the reactor under mixing.

Comparative Example 3

Comparative example 3 was a commercially available copolymer of acrylic acid and 2-acrylamide-2-methylpropanesulfonic acid.

II. Performances Tests

All flasks were rinsed with dilute HCl and thoroughly rinsed with deionized water prior to use.

A. Solutions Preparation:

Cationic solution: About 2.22 g of $CaCl_2$ were dissolved in deionized water and diluted to about 1 liter in total volume to obtain a water sample with about 2000 ppm of Ca as $CaCO_3$.

Anionic solution: About 50 g of $Na_2SiO_3 \cdot 9H_2O$ were dissolved in about 1 liter of deionized water and about 9.5 mL of this solution was mixed with about 1 liter of a prepared $NaHCO_3$ aqueous solution (the concentration of $NaHCO_3$ was about 2.694 g/L) so as to obtain an anion stock solution with about 1600 ppm alkalinity as $CaCO_3$ and about 100 ppm silicon as $SiO_2$.

B. Experimentation:

A specified dosage of an antiscale dispersant composition was added into a reagent bottle. About 250 mL of a cationic solution and about 250 mL of an anionic solution were then added into the bottle to obtain a test sample with the following water quality conditions: about 1000 ppm Ca hardness as $CaCO_3$, about 800 ppm alkalinity as $CaCO_3$, and about 50 ppm silicon as $SiO_2$. The bottle was then shaken to mix the components. After mixing, a pH measurement was made and the bottle was then capped and placed into an 80° C. water bath for about 20 hours Immediately after, a final pH measurement was made and the turbidity was tested. The bottle was also visually inspected for signs of scale.

C. Analysis of Results:

For calcium/total hardness determinations, a test solution was filtered through a 0.45 μm membrane filter. Calcium hardness and total hardness were tested by titration or an IC/ICP method. The inventors calculated % scaling inhibition by the following equation:

$$\% \text{ Scaling inhibition} = \frac{V_E - V_O}{V_T - V_O} \times 100$$

wherein, $V_O$=$Ca_2$+concentration after filtration with no inhibitor present (control sample).

$V_T$=$Ca_2$+concentration when no precipitation occurs.

$V_E$=$Ca_2$+concentration after filtration when inhibitors are present in the test solution.

A higher inhibition rate means a better scaling control performance.

In accordance with the dispersion performance test method, various solutions were prepared. For example, an Fe solution was prepared by dissolving about 0.291 g of anhydrous $FeCl_3$ in deionized water and diluting to about 100 mL to obtain solution A. About 20 mL of solution A were added to about 1.4 mL of 1 mol/L NaOH in tap-water and diluted to 1 liter to obtain solution B. Solution B was then enclosed in a flask and heated for about 24 hours at about 40° C. After heating, about 600 mL of solution B were diluted with tap-water to about 2 liters to obtain the Fe solution C (about 6 ppm). A kaolin suspension liquid was also prepared having a concentration of about 20 g/L and it was stirred for about 2 hours at about 1000 r/min Several flasks were labeled and charged a specific amount of reagent. About 100 mL of Fe solution C were added into every flask in addition to a kaolin suspension. The kaolin suspension was stirred before being added to the flask. The condition of the aqueous sample was about 10,000 ppm of kaolin and about 3 ppm of Fe. The samples were shaken and the pH was measured immediately. Also, the light transmittance of the control sample was tested without adding a reagent. Each flask was sealed and put in a water bath for about 20 hours at about 80° C.

To determine percent dispersion, the light transmittance (% T) was read at 415 nm on a spectrophotometer. On the untreated control sample, the light transmittance was read at time zero, then after the 20 hours of experimentation at the targeted temperature.

The calculations for percent dispersion are:

$$\% \text{ Dispersion} = \left( \frac{\% \ T \ \text{Control} - \% \ T \ \text{Sample}}{\% \ T \ \text{Control} - \% \ T \ \text{Control at } t=0} \right) * 100\%$$

The above experiments were carried out with the compositions of Examples 1-5 and Comparative Examples 1-3 in different dosages (about 8 ppm, about 12 ppm, and about 20 ppm). Scale inhibition and dispersion performance were tested after 20 hours of heating in a water bath at about 80° C. The results are shown in FIG. 1.

It can be seen from the experimental results that Comparative Example 1 has better scaling inhibition performance than Comparative Example 2 while Comparative Example 2 has better dispersion performance. Examples 1 and 2 have superior results compared to Comparative Examples 1 and 2 in both scaling inhibition performance and dispersion inhibition performance The addition of the third component can further enhance the scaling inhibition performance of the composition and the dispersion performance of the composition is also enhanced (see Examples 3 and 4). The pH conditioner has little effect on performance. It can be seen from Comparative Example 3 that all the compositions prepared by Examples 1-5 show better performance than the commonly used product in the industry.

This disclosure is an exemplification of the principles of the embodiments of the presently disclosed invention and is not intended to make any formal or essential limitations to the invention or to limit the invention to the particular embodiments illustrated. It is apparent to a person skilled in the art that elements of technical schemes, compounds, polymers, components, compositions, preparations, and processes can be modified without departing the principle, spirit, and scope of the embodiments and technical schemes of the present application. Additionally, embodiments of the present application include any and all possible combinations of any, some, or all elements of the various embodiments described herein.

What is claimed is:

1. A method of inhibiting scale deposition in an aqueous system comprising:
    adding a composition to the aqueous system, wherein the composition comprises:
        a first component comprising a polymer, wherein the polymer comprises acrylic acid or a salt of acrylic acid;
        a second component comprising a copolymer, wherein the copolymer comprises a sulfonate monomer, at least one of acrylic acid or a salt of acrylic acid, and a fluorescent monomer having the following structural formula:

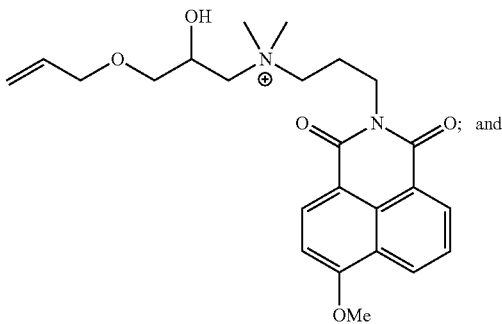 [SMILES: C=CCOCC(O)C[N+](C)(C)CCCN1C(=O)c2cccc3c(OC)ccc(c23)C1=O ; "and"]

a third component comprising an organophosphine compound,
        wherein the composition does not include amino trimethylene phosphonic acid, 1-hydroxyethylidene-1,1-diphosphonic acid, 2-phosphonobutane-1,2,4-tricarboxylic acid, and a salt of 2-phosphonobutane-1,2,4-tricarboxylic acid; and
    inhibiting scale formation,
    wherein the aqueous system is a water processing system of a coal gasification system.

2. The method of claim 1, wherein the sulfonate monomer is selected from the group consisting of 2-acrylamide-2-methylpropanesulfonic acid salt, allylsulfonate, methyl allylsulfonate, meta-styrenesulfonic acid salt, ortho-styrenesulfonic acid salt, para-styrenesulfonic acid salt, and any combination thereof.

3. The method of claim 1, wherein the first component comprises from about 30 weight % to about 80 weight % of acrylic acid or a salt of acrylic acid.

4. The method of claim 1, wherein the second component comprises from about 30 weight % to about 80 weight % of acrylic acid or a salt of acrylic acid and about 10 weight % to about 60 weight % of the sulfonate monomer.

5. The method of claim 1, wherein the organophosphine compound is selected from the group consisting of, a salt of amino trimethylene phosphonic acid, polyamino polyether methylene phosphonic acid, a salt of polyamino polyether methylene phosphonic acid, a polyhydric alcohol phosphate ester, and any combination thereof.

6. The method of claim 1, wherein an amount of the third component is in a range of about 0 to about 35 by weight % of the composition.

7. The method of claim 1, further comprising a pH conditioner.

8. The method of claim 7, wherein the composition comprises up to about 10% by weight of the pH conditioner.

9. The method of claim 1, further comprising water, wherein the first component comprises about 5% to about 30% of a total weight of the composition and the second component comprises about 5% to about 36% of the total weight of the composition.

10. The method of claim 1, further comprising water, wherein the first component comprises from about 10% to about 20% of a total weight of the composition and the second component comprises about 15% to about 30% of the total weight of the composition.

11. The method of claim 1, wherein the first component is a a homopolymer of acrylic acid.

12. The method of claim 1, wherein the second component is a copolymer of acrylic acid, 2-acrylamide-2-methylpropanesulfonic acid or a salt thereof, and 4-MNDMAPN-HAPQ.

13. The method of claim 1, wherein the scale is selected from the group consisting of calcium carbonate, calcium phosphate, iron, aluminum, silicate, calcium sulfate, any suspended solids in the water system, and any combination thereof.

14. The method of claim 1, wherein the scale is calcium carbonate.

15. The method of claim 1, wherein the aqueous system is a water processing system under high temperature conditions up to 280° Centigrade.

* * * * *

UNITED STATES PATENT AND TRADEMARK OFFICE
CERTIFICATE OF CORRECTION

| | |
|---|---|
| PATENT NO. | : 11,760,672 B2 |
| APPLICATION NO. | : 15/757488 |
| DATED | : September 19, 2023 |
| INVENTOR(S) | : Ling Feng Han |

It is certified that error appears in the above-identified patent and that said Letters Patent is hereby corrected as shown below:

On the Title Page

Item [54], delete the Title "ANTISCALE DISPERSANT COMPOSITION AND USE THEREOF" and insert the following title --AN ANTISCALANT DISPERSION COMPOSITION AND USE THEREOF--

In the Specification

Column 1, Lines 1-2, delete the Title "ANTISCALE DISPERSANT COMPOSITION AND USE THEREOF" and insert the following title --AN ANTISCALANT DISPERSION COMPOSITION AND USE THEREOF--

Column 1, Line 8, delete "20150623688.3" and insert --201510623688.3--

In the Claims

In Claim 11, Line 39, delete "a a" and insert --a--

Signed and Sealed this
Ninth Day of April, 2024

Katherine Kelly Vidal
*Director of the United States Patent and Trademark Office*